UNITED STATES PATENT OFFICE.

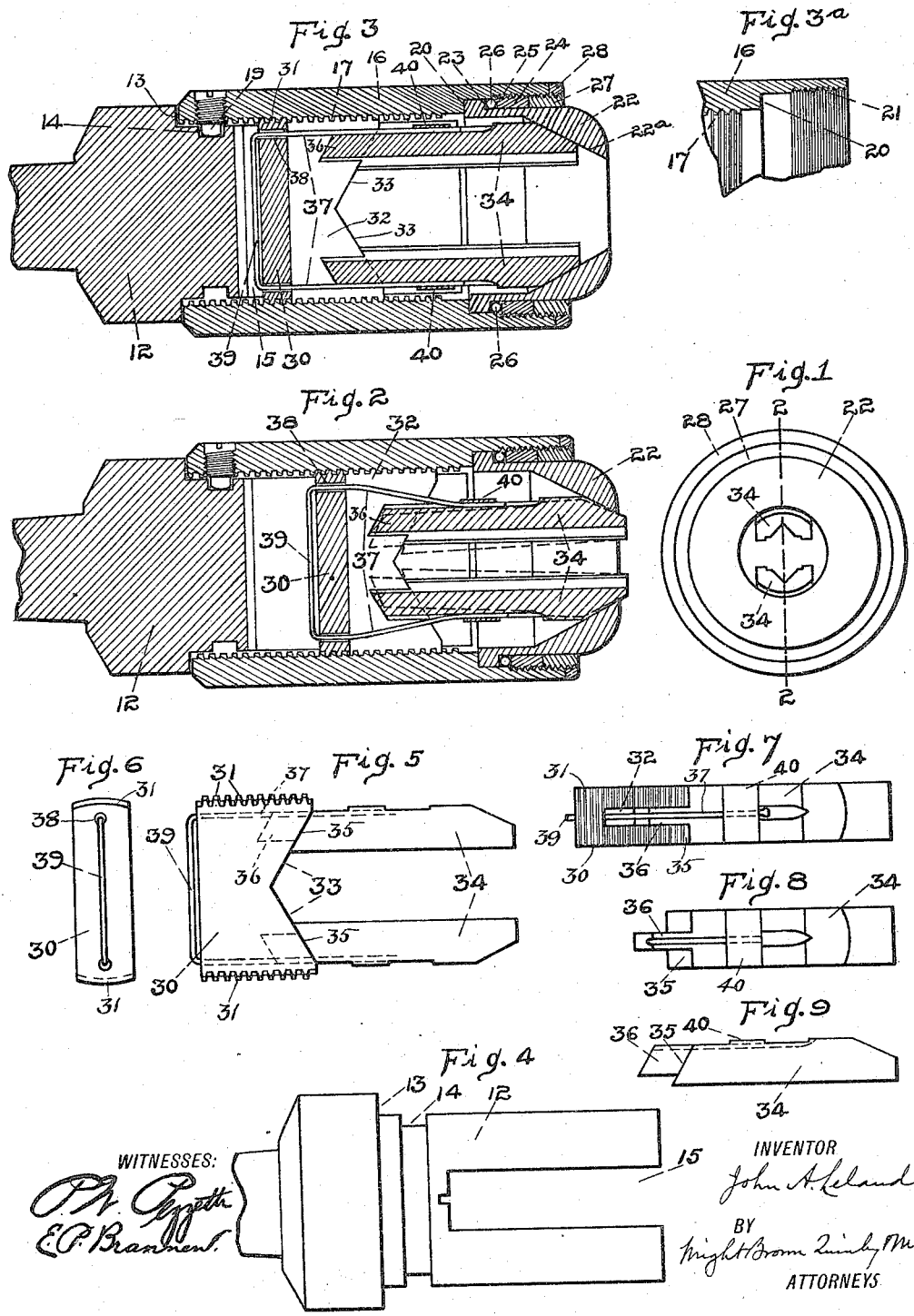

JOHN A. LELAND, OF MONTAGUE, MASSACHUSETTS, ASSIGNOR TO MILLERS FALLS COMPANY, OF MILLERS FALLS, MASSACHUSETTS, A CORPORATION OF MASSACHUSETTS.

CHUCK.

1,184,758.

Specification of Letters Patent. Patented May 30, 1916.

Application filed November 17, 1914. Serial No. 872,602.

*To all whom it may concern:*

Be it known that I, JOHN A. LELAND, a citizen of the United States, and resident of Montague, in the county of Franklin and State of Massachusetts, have invented certain new and useful Improvements in Chucks, of which the following is a specification.

This invention relates to chucks employing a pair of tool shank grasping jaws the acting faces of which are adapted to be held either parallel with each other or inclined relatively to each other under various adjustments, so that the jaws may be engaged not only with straight tool shanks of various sizes but also with tapered shanks of various sizes.

The invention consists in the improvements which I will now proceed to describe and claim.

Of the accompanying drawings forming a part of this specification: Figure 1 represents an end view of a chuck embodying my invention; Fig. 2 represents a section on line 2—2 of Fig. 1, the jaws being projected as when closed upon a tool shank; Fig. 3 represents a view similar to Fig. 2, showing the jaws retracted and fully open; Fig. 3ª is a fragmentary sectional view showing a part of the sleeve; Fig. 4 represents a side view of the part termed the chuck body; Fig. 5 represents a side view of the jaw-carrying follower hereinafter referred to, and the jaws engaged therewith; Fig. 6 represents an end view of said follower; Fig. 7 represents an edge view of the follower and one of the jaws thereof; Figs. 8 and 9 represent elevations of one of the jaws detached.

The same reference characters indicate the same or similar parts in all the views.

In the drawings, 12 represents the chuck body, which is of cylindrical form and is enlarged at its inner end portion to form a shoulder 13 adapted to bear on one end of the sleeve hereinafter described, the main portion of the body being formed to enter said sleeve and provided with a peripheral groove 14 and a longitudinal slot 15.

16 represents a cylindrical sleeve having an internal screw thread 17. The threaded bore of the sleeve is formed to loosely surround the grooved and slotted portion of the body 12, the inner end of the sleeve being opposed to the shoulder 13. The sleeve is engaged with the body by a stud 19 detachably secured to the inner end portion of the sleeve and entering the groove 14, so that the sleeve is separable from the body 12 for a purpose hereinafter described, and is adapted to rotate without endwise movement on the body. The bore of the sleeve has an enlargement at the outer end of the sleeve, as shown by Fig. 3ª, the inner end of said enlargement forming an annular abutment 20. A portion of the enlargement of the bore is provided with an internal screw thread 21.

22 represents a jaw-closing ring which is formed to enter the enlargement of the sleeve bore and is confined against inward movement in the sleeve by the abutment 20, said ring being provided with a tapered or frusto-conical inner surface 22ª. The inner end of the ring 22 has an outwardly projecting flange, one side of which forms an outwardly facing ball race shoulder 23. 24 represents an externally threaded bushing engaged with the internal thread 21, and constituting a bearing for the ring 22 one end of said bushing forming an inwardly facing ball race shoulder 25, which is spaced from the shoulder 23. Between the shoulders 23 and 25 are interposed anti-friction balls 26. The described connection between the sleeve 16 and ring 22 permits the sleeve to rotate independently of the ring, so that the ring may be held stationary by the pressure of the chuck jaws against its inner surface as hereinafter described, the shoulders 23 and 25 and the balls 26 constituting an anti-frictional thrust bearing, permitting the sleeve to rotate independently of the ring without material resistance by friction. The bushing 24 is preferably confined in position by a similar externally threaded bushing 27 engaged with the internal thread 21. The collar 27 may be in turn locked in position by a lock-nut 28 engaged with the external thread of the bushing 27 and bearing on the outer end of the sleeve. The balls 26 are insertible in the bore enlargement of the sleeve 16 when the bushing 24 is removed, and are subsequently confined by the insertion of said bushing.

30 represents a follower, which is preferably a flatsided metal block formed to slide in the slot 15 of the chuck body and having screw-thread segments 31 at its edges engaged with the internal thread 17 of the sleeve 16. The follower is provided with a slot 32 and with oppositely slanted inclines 33 at opposite sides of said slot, said inclines forming seats and guides for chuck jaws 34. Said jaws are provided at their inner end portions with inclined shoulders 35 bearing on the inclines 33 of the follower and with shanks 36 entering the slot 32. The jaws 34 are loosely connected with the follower by spring wire arms 37 passing through orifices 38 in the follower and connected by a neck 39. The outer end portions of the arms 37 are slidably engaged with apertured ears 40 on the backs of the jaws 34. The spring arms 37 normally press the jaws outwardy against the internal surface of the ring 22, and permit the jaws to move from the retracted open position shown by Fig. 3 to the projected position shown by Figs. 1 and 2.

It will now be seen that the rotation of the sleeve 16 imparts a longitudinal movement to the follower 30 and jaws 34, and that the outer ends of the jaws are constantly pressed against the internal surface of the ring 22. The described connection between the ring and the sleeve 16 whereby the sleeve is adapted to rotate independently of the ring enables the ring to stand stationary while the jaws are being adjusted from the position shown by Fig. 3 to that shown by Figs. 1 and 2, the pressure of the jaws against the internal surface of the ring preventing the ring from turning, especially when said pressure is augmented by the bearing of the jaws on a tool shank interposed between them. It is obvious therefore that the frictional resistance to the rotation of the sleeve 16 and to the closing of the jaws upon the tool shank is reduced to the minimum, so that the power applied to the sleeve for the purpose of closing the jaws is fully utilized.

The separable connection between the sleeve 16 and body 12, provided by the stud 19 and groove 14, enables the follower 30 and its jaws to be conveniently inserted in the rear end of the sleeve when the latter is separated from the body. The parts of the chuck may therefore be quickly and conveniently assembled, the ring 22 and balls 26 being conveniently insertible in the outer end portion of the sleeve when the bushing 24 is removed, and confined by the subsequent insertion of the bushing as above described.

Having described my invention, I claim:

A chuck comprising a cylindrical longitudinally slotted body, an internally threaded sleeve separably engaged at its inner portion with said body to rotate thereon without endwise movement, a jaw-closing ring free from said body carried by and having an anti-friction rotatable connection with said sleeve to permit rotation of the sleeve independently of the ring, a follower movable in the slotted body and having screw-threaded segments engaging the internal thread of the sleeve, and jaws loosely connected with the follower and pressed yieldingly against the internal surface of the ring, the separable engagement of the sleeve with the body permitting the insertion of the follower and jaws into the rear end of the sleeve.

In testimony whereof I have affixed my signature, in presence of two witnesses.

JOHN A. LELAND.

Witnesses:
LIZZIE STRACHAN,
LENA PERKINS.

Copies of this patent may be obtained for five cents each, by addressing the "Commissioner of Patents, Washington, D. C."